US012743066B2

(12) United States Patent
Angelopoulos

(10) Patent No.: US 12,743,066 B2
(45) Date of Patent: Sep. 22, 2026

(54) METHOD FOR CONTROLLING A BUILDING AUTOMATION SYSTEM

(71) Applicant: Mitsubishi Electric Corporation, Tokyo (JP)

(72) Inventor: Charalampos Angelopoulos, Livingston (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 488 days.

(21) Appl. No.: 18/361,914

(22) Filed: Jul. 31, 2023

(65) Prior Publication Data

US 2024/0061390 A1 Feb. 22, 2024

(30) Foreign Application Priority Data

Aug. 17, 2022 (EP) .................................... 22190857

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
CPC ...................................................... G05B 19/42
USPC ............................................................ 700/28
See application file for complete search history.

(56) References Cited

U.S. PATENT DOCUMENTS

| | | | | |
|---|---|---|---|---|
| 2015/0032264 | A1* | 1/2015 | Emmons | F24F 11/0001 700/276 |
| 2015/0323427 | A1* | 11/2015 | Sharp | G01N 1/2273 73/863.23 |
| 2018/0023834 | A1 | 1/2018 | Hatch et al. | |
| 2021/0010701 | A1* | 1/2021 | Nesler | F24F 3/14 |
| 2022/0178574 | A1* | 6/2022 | Dong | G16H 50/30 |

(Continued)

OTHER PUBLICATIONS

Wikimedia Foundation, Wikipedia—Feature Scaling, 3 pages. Jan. 18, 2022; retrieved from https://en.wikipedia.org/w/index.php?title=Feature_scaling&oldid=1066492668 on Jan. 10, 2026 (Year: 2022).*

(Continued)

*Primary Examiner* — Mohammad Ali
*Assistant Examiner* — Joshua T Sanders
(74) *Attorney, Agent, or Firm* — XSENSUS LLP

(57) ABSTRACT

The present invention relates to a method for controlling a building automation system comprising the steps of measuring at least two indoor environmental quality parameter values, calculating for the measured indoor environmental quality parameter values a dimensionless indoor environmental quality index from the respective measured indoor environmental quality parameter value, calculating a control index as a weighted sum of the indoor environmental quality indices, and defining a predetermined upper threshold index and starting a control procedure when the control index is below the predetermined upper threshold index, or defining a predetermined lower threshold index and starting the control procedure when the control index is above the predetermined lower threshold index, wherein the control procedure includes controlling the BAS such that at least one, multiple or all indoor environmental quality indices are each within a respective first predetermined range.

19 Claims, 4 Drawing Sheets

(56) References Cited

U.S. PATENT DOCUMENTS

2022/0404056 A1* 12/2022 Bloemer .................. F24F 11/58

OTHER PUBLICATIONS

Extended European Search Report mailed on Jan. 24, 2023, received for European Application 22190857.7, 8 pages.
Office Action issued Apr. 28, 2026 in Chinese Patent Application No. 202311014556.1, 15 pages.

* cited by examiner

METHOD FOR CONTROLLING A BUILDING AUTOMATION SYSTEM

CROSS-REFERENCE TO RELATED APPLICATION

The present application claims priority to European Patent Application No. 22190857.7, filed Aug. 17, 2022, the entire contents of which are incorporated herein by reference.

The present invention relates to a method for controlling a building automation system.

People spend on average approximately 90% of their time indoors. The World Health Organization acknowledges the right of every human being to breathe healthy indoor air and has published guidelines for air quality. The quality of the air people breathe indoors directly impacts their health, well-being and productivity and constitutes one of the most important aspects of healthy buildings. To protect the population, many standards have been developed for the acceptable ranges and threshold values for indoor environmental quality parameters, combining provisions for energy efficiency, thermal comfort and improved indoor air quality.

Energy saving and indoor environmental quality improvements are inter-related but it is possible to simultaneously achieve both. The thermal, hygrometric and indoor air quality aspects are considered to affect the well-being and productivity in buildings but also the energy costs to maintain appropriate comfort conditions.

Hence, the evaluation of these indoor environmental quality parameters is important to assess the performance of the indoor environment and adjust the control of a building automation system accordingly to maintain and/or improve the indoor environment. The majority of building automation system devices can automatically operate according to the detected temperature and humidity information, for example, when the temperature is too high, the cooling mode is automatically selected, when the temperature is too low, the heating mode is automatically selected, and when the humidity is too high, the dehumidification mode is automatically turned on. However, most of the building automation systems rely on a single sensor to take a control action, and the sensor only measures temperature and humidity. The rest of the indoor air quality parameters such as particulate matter, total volatile organic compounds and/or CO2 in most of the cases are neglected.

When developing a new control methodology for a building automation system, it is vital to incorporate all the available data from the sensors to ensure a thermally comfortable internal environment with high levels of indoor air quality. The latter has attracted even more attention after the Covid-19 pandemic. Although there are studies that have highlighted the importance of including all the indoor air quality and thermal comfort parameters in assessing the indoor environment, there is still gap in the knowledge on how to use this information to control a building automation system.

The quality of the indoor environment depends on the design and operation of building systems that control thermal comfort and/or indoor air quality. Providing and maintaining acceptable levels whilst keeping energy costs and carbon emissions low is an energy demanding exercise that requires designers, owners and users of buildings to make the right balance between energy saving imperatives and providing comfort.

The objective of this invention is to provide a methodology to calculate a control index to assess the indoor environment. The control index will account for both indoor air quality and thermal comfort. This control index will be used then to inform the control algorithms that are developed as part of this invention. Given the current availability of real-time data regarding system operation, environmental conditions, (outdoor temperature, relative humidity etc) as well as a variety of indoor conditions, including but not limited to air temperature, relative humidity, particulate matter, total volatile organic compounds, CO2, a method is proposed to control a building automation system to ensure energy savings and thermal comfortable internal environment.

This object is achieved by the method according to claim 1. The dependent claims are preferred embodiments.

The invention relates to a method for controlling a Building Automation System, BAS. The Building Automation System is a system that can move, replace, cool and/or heat air, and/or generally change the physical properties of air inside a building. In some embodiments the BAS can include or is a heating ventilation air-conditioning (HVAC) system, a unit for mechanical ventilation with heat recovery (MVHR), a humidifier, an air purifier, and a fan with a filter.

In a first step of the method according to the invention at least two indoor environmental quality parameter values are measured. The indoor environmental quality parameters each describe a measurable physical property of air. In this sense also, the composition of air or the quantity of components of air can be regarded as a physical property of air.

The term "indoor environmental quality parameter value" describes a measured value of the corresponding indoor environmental quality parameter.

The physical properties of air can for example affect the comfort perceived by a person and/or the air quality in general. Therefore the indoor environmental quality parameters can for example be related to the comfort perceived by individuals and/or air quality. Comfort and air quality in this sense can be understood as a measure of satisfaction, well-being and/or positive or negative impact on the health of a person. In the following the term "quality of air" will also be used for the above mentioned comfort and/or air quality.

In a next step of the invention, a dimensionless indoor environmental quality index is calculated for the measured indoor environmental quality parameter values. The indoor environmental quality index can be a numerical value. The indoor environmental quality index can for example relate the corresponding measured indoor environmental quality parameter value to the quality of air that is caused by this indoor environmental quality parameter.

The indoor environmental quality index can preferably be calculated from the corresponding indoor environmental quality parameter value such that it is proportional or inversely proportional to the quality of air. Preferably the indoor environmental quality index allows for comparing different indoor environmental quality parameters with one another.

Preferably all indoor environmental quality indices can have values within the same range. This can make the different indoor environmental qualities comparable.

In a further step of the method according to the invention, a control index is calculated as a weighted sum of the indoor environmental quality indices. The weighted sum is preferably a sum of all environmental quality indices that are each multiplied with a respective weight prior to summation.

The control index can quantify the overall quality of air and can take all regarded indoor environment quality indices into account. This means that the control index can give a measure of the overall quality of air. The control index can be used in a later step to decide if measures should be taken to improve the comfort and/or air quality.

The weights of the weighted sum can determine the impact of each parameter on the control index, and thus overall comfort perceived by persons, on the air quality, satisfaction, wellbeing and/or positive or negative impact on the health of a person. Preferably the weights are dimensionless. The weights can be numerical values that are larger than 0. Preferably the sum of all the weights can be equal to 1. The weights can preferably prioritize one or some indoor environmental quality parameters over other indoor environmental quality parameters.

Preferably, the weights of the weighted sum are deduced from user preferences. In some embodiments, the user or users can set each weight for each regarded indoor environmental quality parameter separately. In some embodiments a user or users can provide inputs regarding their priority on the importance of each of the indoor environmental quality parameters. This information can then be used to deduce the weights of the weighted sum. If the indoor environmental quality indices are optionally calculated such that they have values within different ranges, the weights can also be used to compensate for that. In this way the environmental quality indices can be made comparable.

The BAS should preferably only take measures to change the physical properties of the air, if the overall quality of air as quantified by the control index is low. Therefore, the method according to the invention further comprises the steps of defining a predetermined upper threshold index and starting a control procedure when the control index is below this predetermined upper threshold index, or defining a predetermined lower threshold index and starting the control procedure when the control index is above this predetermined lower threshold index. An upper threshold index can be defined if the control index is calculated to be proportional to the air quality such that higher values of the control index indicate higher quality of air. A lower threshold can preferably be defined if the control index is calculated to be inversely proportional to the air quality such that lower values of the control index indicate higher quality of air.

The control procedure includes controlling the BAS such that at least one, multiple or all indoor environmental quality indices are each within a respective first predetermined range. The first predetermined ranges can be set individually for each of at least one, multiple or all indoor environmental quality indices. That is, a particular first predetermined range may be set for one indoor environmental quality index, another particular first predetermined range may be set for another indoor environmental quality parameter and so on. The BAS preferably moves, replaces, cools, heats, and/or changes the physical properties of the air such that that at least one, multiple or all indoor environmental quality indices are each within their respective first predetermined range.

Preferably the BAS can move, replace, cool and/or heat, or change the physical properties of the air such that at least one, multiple or all environmental quality indices are within their predetermined range.

The method according to the invention can preferably be executed multiple times in a specific time period in order to ensure a high quality of air over this time period. The length of the time period, a rate with which the method is executed in this time period, and/or the number of times the method is executed during this time period can be predetermined or set by a user. The rate with which the method is executed within a time period can preferably be a constant rate. Optionally, the length of the time period can be undefined and the method is executed multiple times at a defined rate until the execution is stopped by a user.

In an advantageous embodiment measuring at least two indoor environmental quality parameter values can comprise the steps of acquiring a time series of each of the at least two indoor environmental quality parameter values over a period of time $t_M$ and determining an average value of each of the quality parameter values over the time series, and setting the respective average values as the measured indoor environmental quality parameters. A time series of the indoor environmental quality parameter preferably contains at least two measured values that are measured at different points of time within the period of time $t_M$. Preferably, the measurements of the measured values of the time series are executed at a constant rate. Preferably, the length of the time period $t_M$ may be different for each indoor environmental quality parameter.

The indoor environmental quality indices can for example range between 0 and 100. When the indoor environmental quality index is calculated such that it is proportional to the perceived quality, a highest value, e.g. 100, of the indoor environmental quality index may indicate the highest perceived quality. In another case, when the indoor environmental quality index is calculated such that it is inversely proportional to the perceived quality, a lowest value of the indoor environmental quality index, e.g. 0, may indicate the highest perceived quality.

In some embodiments indoor environmental quality parameters, indoor environmental quality parameter values, indoor environmental quality indices and/or the control index can be shown to the user or users. The BAS can comprise a display that can display the indoor environmental quality parameters, indoor environmental quality parameter values, indoor environmental quality indices and/or the control index can be shown to the user or users.

In preferred embodiments the possible range of values of the indoor environmental quality parameter P can be divided into one or more quality categories $Q_P$. The value range of each indoor environmental quality parameter can preferably be divided into a different number of quality categories. Each quality category may be defined by at least one interval of the possible range of values of the respective indoor environmental quality parameter. Each quality category can comprise an upper limit $C_{QP}$ and a lower limit $B_{QP}$.

The expression that a measured indoor environmental quality parameter value $A_P$ falls within a quality category $Q_P$, describes that $A_P$ is larger than the lower limit $B_{QP}$ of this particular quality category $Q_P$ and smaller than the upper limit $C_{QP}$ of this particular quality category $Q_P$.

Each quality category $Q_P$ further comprises an upper limit of the indoor quality parameter index $E_{QP}$ and a lower limit of the indoor quality parameter index $D_{QP}$, that describe the quality of air associated with the upper limit and lower limit of the quality category $Q_P$. The upper limit of the index $E_{QP}$ is representing a higher quality of air than the lower limit of the index $D_{QP}$. When the indoor environmental quality index is calculated such that it is proportional to the quality of the air, the numerical value of $E_{QP}$ is larger than the numerical value of $D_{QP}$. When the indoor environmental quality index is calculated such that it is inversely proportional to the quality of air, the numerical value of $E_{QP}$ is smaller than the numerical value of $D_{QP}$.

The indoor environmental quality index $K_{AP}$ can preferably be calculated as $$K_{AP}=(A_P-B_{QP})/(C_{QP}-B_{QP})*(D_{QP}-E_{QP})+E_{QP},$$

where $B_{QP}$, $C_{QP}$, $D_{QP}$, $E_{QP}$ are the above described limits of the quality category $Q_P$ in which $A_P$ falls.

In some advantageous embodiments the upper limit of the indoor environmental quality index and the lower limit of the indoor environmental quality index of each quality category of at least one indoor environmental parameter can be equally spaced apart. This can mean that the differences $(E_{QP}-D_{QP})$ and $(E_{Q'P}-D_{Q'P})$ are equal, wherein $Q_P$ and $Q'_P$ are different quality categories of the same parameter P. Alternatively or additionally the upper limit of the indoor environmental quality index of one quality category can be the lower limit of the indoor environmental quality index of one of the adjacent quality categories.

Preferably the method according to the invention further comprises the steps of acquiring a time series of each of the indoor environmental quality indices over a period of time, and calculating average values of each of the quality indices over the time series. These average values of each of the quality indices are in the following denoted as the averaged indoor environmental quality indices. The control index can then be calculated as a weighted sum of all of the averaged indoor environmental quality indices. Optionally, the weights can be all equal to 1 divided by the number of averaged indoor environmental quality indices, such that the weighted sum represents the mean value of all the averaged indoor environmental quality indices.

In some embodiments, the indoor environmental quality indices $K_{AP}$ that were determined for each indoor environmental quality parameter P as described above can be further processed before using them to calculate the control index. In a first step of this processing a time series of each of the indoor environmental quality indices $K_{AP}$ over a period of time $T_P$ can be acquired. In a next step, time fractions $t_{QP}$ can be determined as the amount of time that an indoor environmental quality parameter value $A_P$ or indoor environmental quality index $K_{AP}$ falls within a quality category $Q_P$. In a further processing step average values $V_{tQP}$ can be determined as the average values of a times series of the indoor environmental quality index $K_{AP}$ that is obtained over the time fractions $t_{QP}$. In a next step a weighted sum $S_P$ of these average values $V_{tQP}$ can be calculated for each parameter, where the respective time fractions $t_{QP}$ are used as weights. $S_P$ can afterwards be divided by the sum of all the time fractions $t_{QP}$. The sum of all $t_{QP}$ of a respective indoor environmental parameter P can be equal to $T_P$. The results can be used as the indoor environmental quality index that corresponds to the respective indoor environmental quality parameter P. The control index can then be calculated as a weighted sum of all of these indoor environmental quality indices. Optionally, the weights can be all equal to 1 divided by the number of these indoor environmental quality indices, such that the weighted sum represents the mean value of all these indoor environmental quality indices.

In preferred embodiments of the invention an upper limit of one category can be the lower limit of the adjacent higher quality category for at least one indoor environmental quality parameter and/or an upper limit of one category can be the lower limit of the adjacent higher quality category for at least one indoor environmental quality parameter.

Optionally at least one of the indoor environmental quality parameter values can be a measured value of a single sensor or an average of measured values of multiple sensors of the same kind. Sensors of the same kind are sensors that are able to measure the same physical property, i.e. sensors that can obtain values of the same indoor environmental quality parameter. Preferably, the sensors measuring the same physical property are sensors of the same type. Optionally these can be different type of sensors as long as they are able to measure the same physical property.

In some preferable embodiments at least one of the sensors that measures an indoor environmental quality parameter value can preferably communicate wirelessly with a controller that controls the BAS and/or transmit the measured indoor environmental quality parameter value wirelessly.

The building may comprise one or several thermal zones that can be addressed individually by the BAS. A thermal zone can be a locally restricted area of the building. If there is more than one thermal zone, these thermal zones can preferably be arranged such that they do not affect each other strongly. This can mean that no large amounts of air can move from one thermal zone to another thermal zone without being transported by the building automation system and/or that different thermal zones are thermally isolated from each other. A thermal zone can in some cases also be arranged outside of a building.

In an advantageous embodiment each indoor environmental quality parameter can be locally restricted to a thermal zone. In this case an indoor environmental quality parameter value can be the measured value of the respective physical quantity of air in this locally restricted thermal zone. The indoor environmental parameter values can be obtained with one or more appropriate sensors and/or transferred to the BAS.

Optionally, environmental quality indices can also be calculated for different thermal zones from the respective measured indoor environmental quality parameter values. Preferably a control index may therefore also be calculated for one, multiple or all thermal zones, by using respective environmental quality indices. The control index can in this case provide a measure of the overall quality of air in each of one, multiple or all the thermal zones.

In an advantageous embodiment the method can further comprise the steps of measuring at least one outdoor environmental quality parameter value that is of the same kind, i.e. that measures the same physical property, as one of the indoor environmental quality parameters. The same kind refers to the same physical property. The outdoor environmental quality parameter can thus be a measurable physical property of air. The outdoor environmental quality parameter value can be a measured value of the corresponding outdoor environmental quality parameter. The outdoor environmental quality parameter can preferably be measured outside of the building, i.e. in an outdoor environment. The indoor environmental quality parameter can be measured inside the building, i.e. in an indoor environment.

A thermal zone in which the outdoor environmental quality parameter can be measured can be advantageously defined as the outdoor environment. The thermal zone in which the indoor environmental quality parameter can be measured can advantageously defined as the indoor environment. The outdoor environment can thus be a different thermal zone than the indoor environment. In a preferably embodiment the outdoor environmental quality parameter can be measured outside of a building, such that also the outdoor environment is outside of a building. Optionally the outdoor environmental quality parameter can be measured inside a building but in another thermal zone than the indoor environmental parameter.

The control procedure can preferably further include the steps of controlling the BAS such that under certain conditions air from an outdoor environment is fed into an indoor environment. This can help to save energy.

There are at least three conditions that should preferably be fulfilled so that feed air is fed from the outdoor environment into the indoor environment. Firstly additional ventilation may be required in order to keep at least one of the indoor environmental quality parameters within its first predetermined range. Additional ventilation preferably means that air is to be replaced in and/or moved to or away from the respective thermal zone.

Secondly each of the outdoor environmental parameters preferably has values within respective predetermined ranges. The predetermined ranges are preferably set such that feeding air having parameters within these ranges into the indoor environment does not spoil the air quality in the indoor environment.

The third requirement is that the indoor environmental quality parameters which are of the same kind as the outdoor environmental parameters also should preferably to be within same respective predetermined ranges.

Preferably the at least two indoor environmental parameters and the at least one outdoor environmental parameter are selected from a group comprising air temperature, relative humidity, total volatile organic compounds, carbon dioxide and particulate matter, as for example particulate matter with diameters smaller than 2.5 micrometers, PM2.5, or particulate matter with diameters smaller than 10 micrometers, PM10.

The subject matter of the invention and its preferred embodiments are illustrated in three figures.

FIG. 1 shows a block diagram of one example of the invention to control a building automation system, BAS, that may include a heating ventilation air conditioning, HVAC, system, a unit for mechanical ventilation with heat recovery, a humidifier, an air purifier, a fan with a filter.

In this example there are five indoor environmental quality parameters that are measured in a thermal zone:

- temperature of the air in the thermal zone;
- relative humidity, RH, of the air in the thermal zone;
- the $CO_2$ level of the air in the thermal zone;
- the amount of particulate matter, PM2.5, contained in the air in the thermal zone; and
- the amount of total volatile organic compounds, TVOC, in the air in the thermal zone.

Indoor environmental quality parameter values can be measured with at least one sensor that is appropriate to measure the respective physical quantity of the indoor environmental parameters. For example the temperature can be measured with a temperature sensor, the relative humidity can be measured with a humidity sensor, the $CO_2$ level can be measured with a $CO_2$ sensor, the amount of particulate matter can be measured with appropriate particle sensors, and the amount of total volatile organic compounds can be measured with an appropriate total volatile organic compound sensor.

Figure 3:
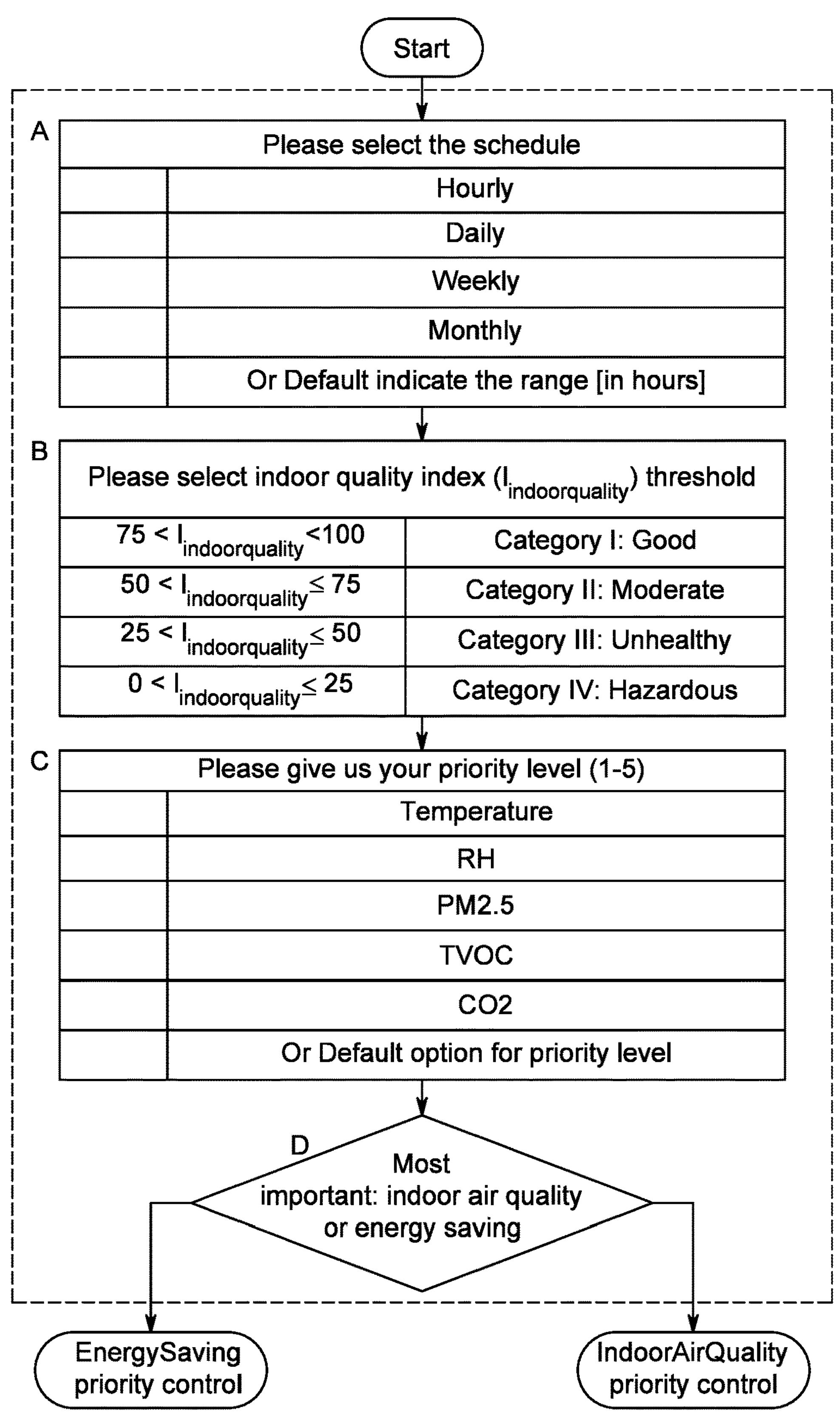
FIG. 3 shows a diagram of a master control logic of the invention.

A first step, represented by block E, checks if a default option for priority level has been selected by a user, see block C of FIG. 3. If yes, block F is executed subsequently, if not, block G is executed in a next step. Blocks F and G represent two different methods to calculate a control index from measured indoor environmental quality parameter values.

The method in block F comprises the steps F1, F2, F3, and F4.

In step F1 indoor environmental quality parameter values are measured for each indoor environmental quality parameter. In step F2 a dimensionless indoor environmental quality index from each measured indoor environmental quality parameter value is calculated. These steps, F1 and F2, are repeated a specific number of times in order to create a time series for each indoor environmental quality index. In a next step, F3, the average value from each time series is determined and passed on as the respective indoor environmental quality index. The indoor environmental quality indices are in this example $I_{temperature}$ (for the indoor environmental parameter temperature), $I_{RH}$ (for the indoor environmental parameter relative humidity), $I_{CO2}$ (for the indoor environmental parameter $CO_2$ level), $I_{PM2.5}$ (for the indoor environmental parameter related to the amount of particulate matter), and $I_{TVOC}$ (for the indoor environmental parameter related to the amount of total volatile organic compounds). In step, F4, a weighted sum, i.e. the mean value, of all average values is calculated and passed on as the control index $I_{calculated}$.

The method in block G comprises the steps G1, G2 and G3.

In step G1, indoor environmental quality parameter values are measured for each indoor environmental quality parameter. In step G2 a dimensionless indoor environmental quality index from each measured indoor environmental quality parameter value is calculated. The indoor environmental quality indices are $I_{temperature}$, $I_{RH}$, $I_{CO2}$, $I_{PM2.5}$, and $I_{TVOC}$. In a next step, G3, a weighted sum of all indoor environmental quality indices is calculated and passed on as the control index $I_{calculated}$. The weights can be determined from user preferences in block C of FIG. 3.

In a next step, represented by block H, the calculated control index $I_{calculated}$ that has been calculated either by block F or block G, can be shown to a user. The control index is afterwards passed on to block I that represents a further step of the method. In this step the control index $I_{calculated}$ is compared to a predetermined upper threshold index $I_{selected\text{-}indoor\ quality}$.

If the control index is larger than the upper threshold index $I_{selected\text{-}indoor\ quality}$, the steps of block U are executed subsequently. In block U, steps are performed that check if the time is within a selected schedule that can be selected by a user. If the time is within the selected schedule, the steps of block E are executed again. If the time is not within the selected schedule, steps A, B, C, D to obtain user preferences are performed. These steps are shown in FIG. 3 and will be described in detail below. The time in this sense is the amount of time that has elapsed since the last user preferences were obtained.

If the control index is smaller than the upper threshold index, a control procedure, comprising the steps of blocks K, M, O, P, Q and S are executed consecutively. In each of these blocks, the BAS is controlled such that one of the indoor environmental quality indices is within a respective first predetermined range.

Block K performs steps to check if the indoor environmental quality index that is related to temperature $I_{temperature}$ is within the range set by $I_{lowerlimit,range}$ and $I_{upperlimit,range}$. If $I_{temperature}$ is not within this range, the steps represented by block L are executed. These steps comprise operating the HVAC/mechanical heating and cooling to meet a predefined first setpoint for temperature. Optionally block K can be executed again after performing the steps of block L. If $I_{temperature}$ is within the predefined range, the steps represented by block M are executed.

Block M performs steps to check if the indoor environmental quality index related to relative humidity $I_{RH}$ is within the range set by $I_{RH\_lowerlimit,range}$ and $I_{RH\_upperlimit,range}$. If $I_{RH}$ is not within this range, the steps represented by block N are executed. These steps comprise operating the humidifier to meet a predefined second setpoint for relative humidity. Optionally block M may be executed again after performing the steps of block N. If $I_{RH}$ is within the predefined range, the steps represented by block O are executed.

Block O performs steps to check if the indoor environmental quality index that is related to the $CO_2$ level $I_{CO2}$ is within the range set by $I_{CO2\_lowerlimit,range}$ and $I_{CO2\_upperlimit,range}$. If $I_{CO2}$ is not within this range, the steps represented by block P are executed. These steps comprise increasing the ventilation rate. Block O may be executed again after performing the steps of block P. If $I_{CO2}$ is within the predefined range, the steps represented by block Q are executed.

Block Q performs steps to check if the indoor environmental quality index that is related to the level of particulate matter $I_{PM2.5}$ is within the range set by $I_{PM2.5\_lowerlimit,range}$ and $I_{PM2.5\_upperlimit,range}$. If $I_{PM2.5}$ is not within this range, the steps represented by block R are executed. These steps comprise switching on an air purifier and/or a fan with a filter. Optionally block Q may be executed again after performing the steps of block R. If $I_{PM2.5}$ is within the predefined range, the steps represented by block S are executed.

Block S performs steps to check if the indoor environmental quality index that is related to the amount of total volatile organic compounds $I_{TVOC}$ is within the range set by $I_{TVOC\_lowerlimit,range}$ and $I_{TVOC\_upperlimit,range}$. If $I_{TVOC}$ is not within this range, the steps represented by block T are executed. These steps comprise increasing a ventilation rate and switching on an air purifier and/or a fan with a filter. Optionally block S can be executed again after performing the steps of block T. If $I_{TVOC}$ is within the predefined range, the steps represented by block U are executed.

The steps performed by block U are described above.

Figure 1:
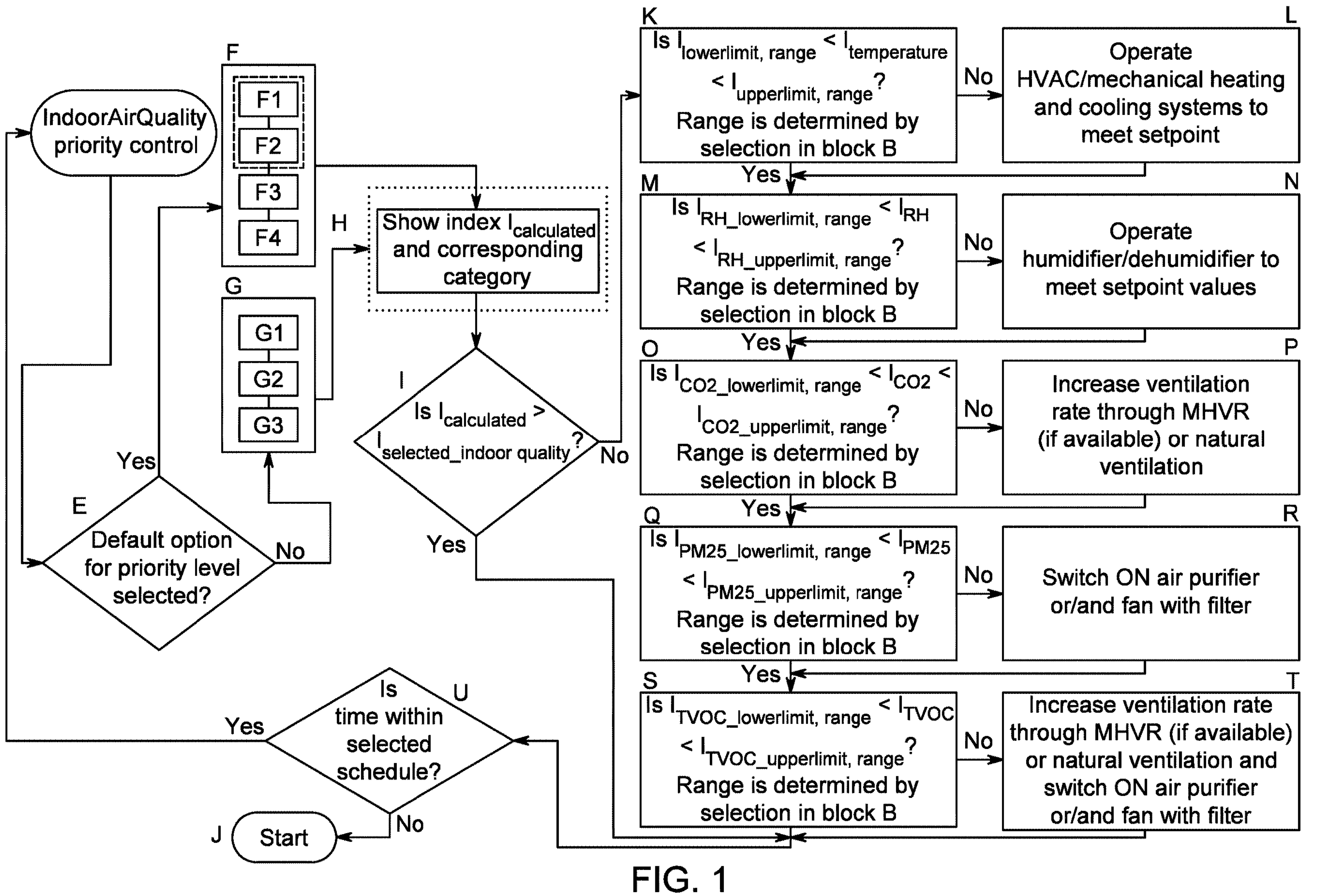
FIG. 1 shows a flow diagram of a first embodiment of the method.
Figure 2A:
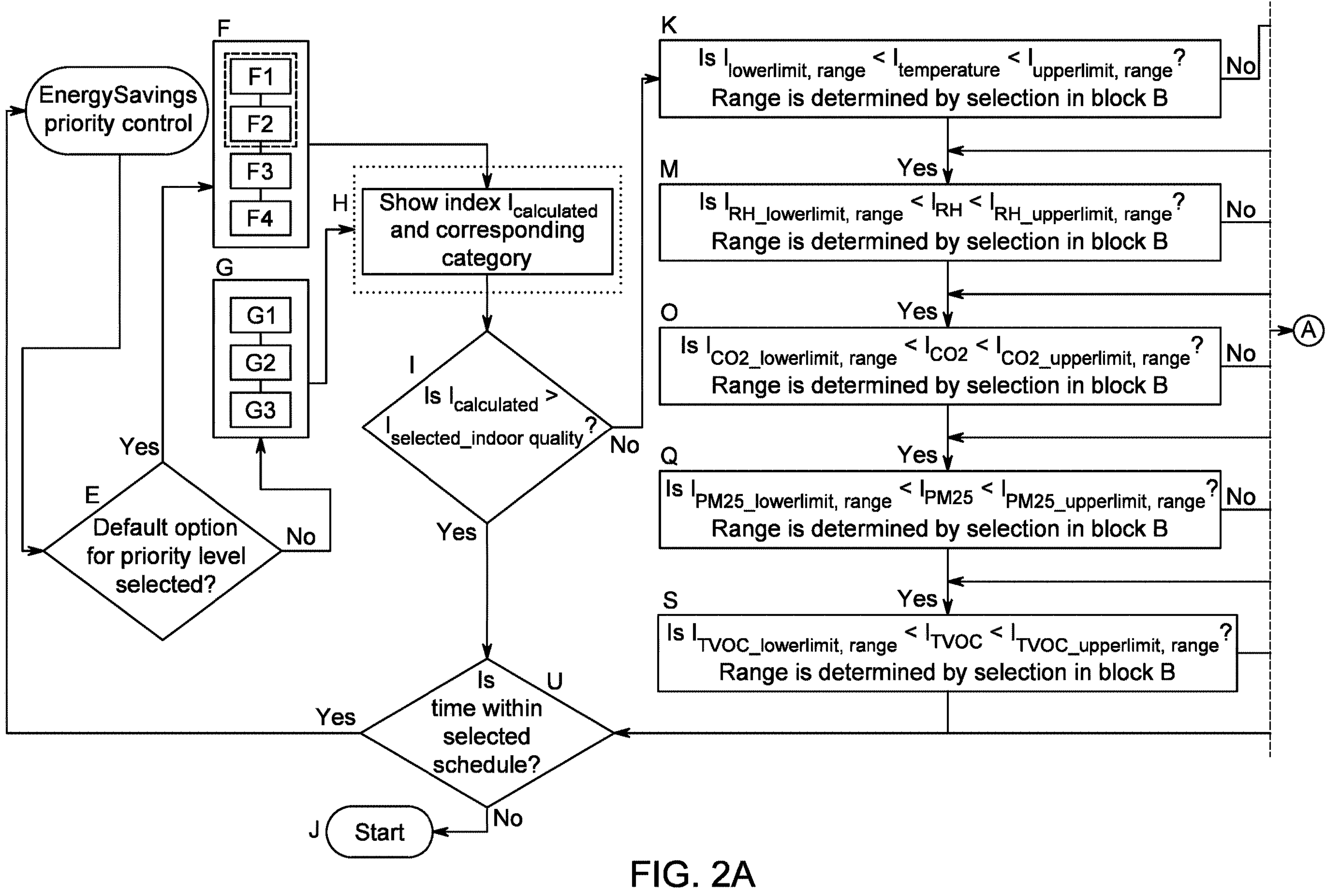
FIG. 2 shows a flow diagram of a second embodiment of the method.
Figure 2B:
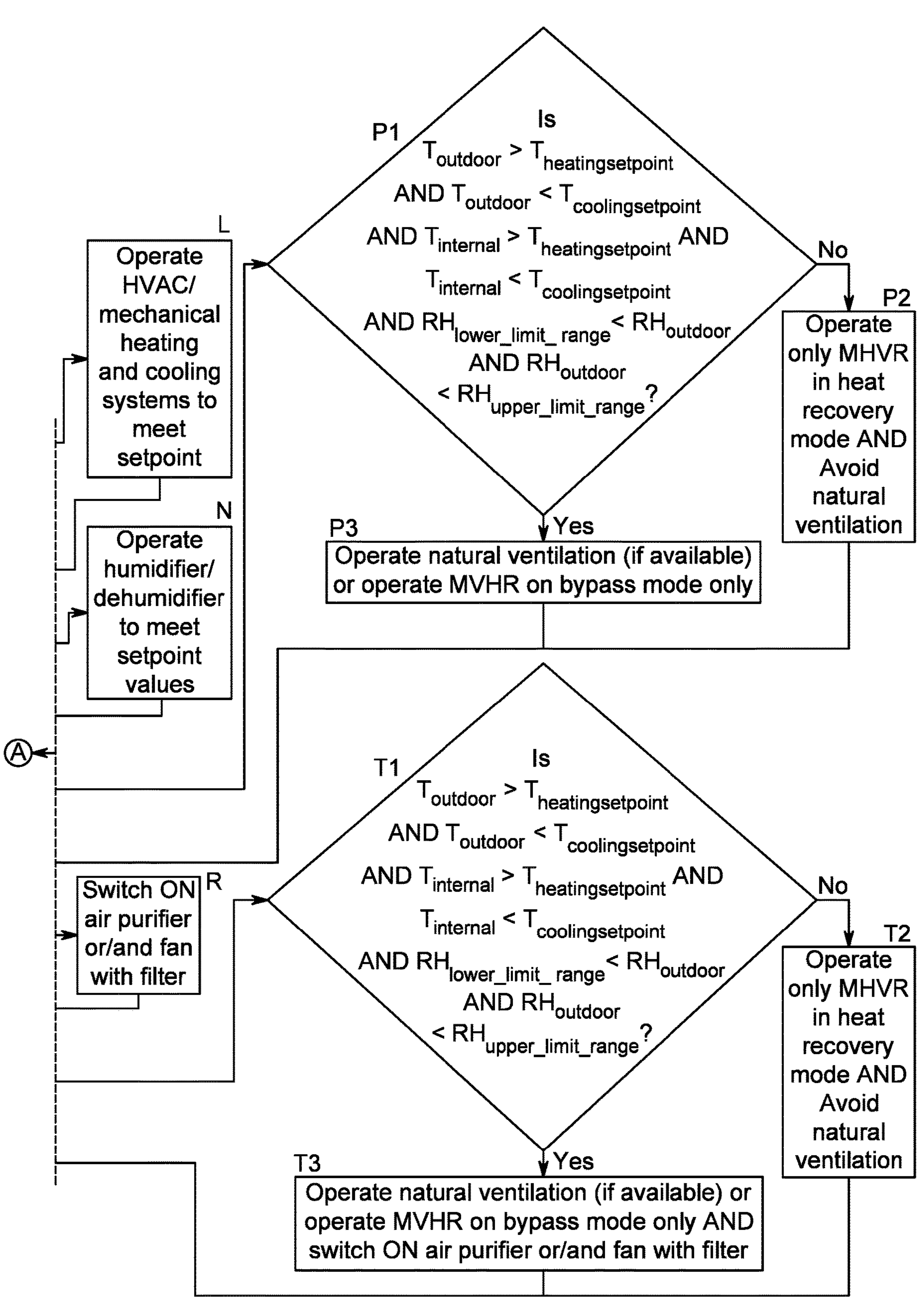

FIG. 2 shows a block diagram of a second embodiment of the invention to control a building automation system, BAS, that includes a heating ventilation air conditioning, HVAC, system; a unit for mechanical ventilation with heat recovery, MHVR; a humidifier; an air purifier; a fan with a filter.

In the second embodiment the same five indoor environmental quality parameters as in the first embodiment are measured in a first thermal zone. The first thermal zone is denoted as the indoor environment. The indoor environmental quality parameters are:

- temperature of the air inside the indoor environment;
- relative humidity, RH, of the air inside the indoor environment;
- the $CO_2$ level of the air inside the indoor environment;
- the amount of particulate matter, PM2.5, contained in the air inside the indoor environment; and
- the amount of total volatile organic compounds, TVOC, in the air inside the indoor environment.

Additionally, there are two outdoor environmental quality parameters measured in a second thermal zone that are of the same kind as one of the indoor environmental quality parameters. The second thermal zone is denoted as the outdoor environment in the following. The outdoor environmental parameters are:

- temperature of the air in the outdoor environment; and
- relative humidity, RH, of the air in the outdoor environment.

Except for the steps in two blocks, P and T, all the steps that are performed in the second embodiment are the same as in the first embodiment. Block P of the first embodiment is replaced by blocks P1, P2 and P3 in the second embodiment, and block T of the first embodiment is replaced by blocks T1, T2, T3 in the second embodiment.

The steps performed in block P1 are executed, if block O determines that $I_{CO2}$ is not within its predetermined range. The steps of block P1 include several comparisons between indoor environmental values and outdoor environmental values with predefined respective ranges: If the outdoor environmental parameter value of temperature $T_{outdoor}$ and the indoor environmental parameter value of temperature $T_{indoor}$ are both within a predetermined temperature range, and the outdoor environmental parameter value of relative humidity $RH_{outdoor}$ is within a predetermined relative humidity range, then the steps of block P3 are performed. If not, the steps of block P2 are performed. The temperature range is defined by an upper limit $T_{coolingsetpoint}$ and a lower limit $T_{heatingsetpoint}$. The relative humidity range is defined by an upper limit $RH_{upper\_limit\_range}$ and a lower limit $RH_{lower\_limit\_range}$.

The steps performed in block P2 are operating a mechanical ventilation heat recovery in heat recovery mode and to avoid natural ventilation. Natural ventilation is allowing air from the outdoor environment to be moved into the indoor environment.

The steps performed in block P3 include the use of natural ventilation and/or operating the MVHR in bypass mode.

The steps performed in block T1 are executed, if block S determines that $I_{TVOC}$ is not within its respective predetermined range. The steps of T1 are the same as the steps performed in P1. If the indoor and outdoor environmental parameters are within their respective range, the steps of P3 are performed. If not, the steps of P2 are performed.

P2 includes the steps of operating only the MHVR in recovery mode and to avoid natural ventilation. P3 includes the steps of operating natural ventilation if available, or operating MHVR on bypass mode only and switching on an air purifier and/or a fan with a filter.

FIG. 3 shows a diagram that illustrates a master control logic of the invention that is available for users of the BAS. In block A, the users/occupants will give information about the desirable schedule. The desirable schedule is time period in which the user is asked to update its preferences. It is used in block U.

In block B, the users/occupants will give their preference regarding the level of indoor quality that they want to achieve in the space. In this embodiment it allows the user to define the upper threshold index $I_{selected\text{-}indoor\ quality}$ that is used to decide if the BAS is taking measures to improve air quality in block I.

In block C the users can provide preference on which parameter is more important to them. The users can also decide to not set preferences but use a default option for the priority level. This is checked later on in block E, that decides based on this input if block G or block F is executed. If the users set preferences, weights can be deduced from these user preferences that can be used to calculate the control index as a weighted sum of the indoor environmental quality indices in block G. If the default option is selected, block F will be executed.

User preferences can include setting a priority to the indoor environmental quality parameters. In this case, for example, the weight for the indoor environmental quality parameter with the highest priority can be set to 1, the weight for the indoor environmental quality parameter with the second highest priority can be set to ½, the weights of the third highest priority can be set to ⅓ and so on. All the weights can also be set in such a way, that the sum of all the weights is equal to 1.

In some embodiments with five indoor environmental quality parameters, the weight for the indoor environmental quality parameter with the highest priority can be 0.44, the weight for the indoor environmental quality parameter with the second highest priority can be 0.22, the weight for the indoor environmental quality parameter with the third priority can be 0.14, the weight for the indoor environmental quality parameter with the fourth priority can be 0.11, and the weight for the indoor environmental quality parameter with the lowest priority can be 0.09.

Lastly, the users/occupants will provide information if indoor air quality or energy savings are more important to them. If indoor air quality is more important to the user, the steps of the first embodiment described above will be performed. If energy savings are more important to the user, the steps of the second embodiment described above will be performed.

The invention claimed is:

1. A method, comprising:

controlling a Building Automation System (BAS), including the steps of:

measuring at least two indoor environmental quality parameter values, calculating for the measured indoor environmental quality parameter values a dimensionless indoor environmental quality index from the respective measured indoor environmental quality parameter value, calculating a control index as a weighted sum of the indoor environmental quality indices, and defining a predetermined upper threshold index and starting a control procedure when the control index is below the predetermined upper threshold index, or defining a predetermined lower threshold index and starting the control procedure when the control index is above the predetermined lower threshold index, wherein the control procedure includes controlling the BAS such that at least one, multiple or all indoor environmental quality indices are each within a respective first predetermined range, and weights of the weighted sum are deduced by:

receiving inputs from a user regarding a priority of importance for each of the measured indoor environmental quality parameter values; and setting the weights for the indoor environmental quality parameter according to the priority of importance sequentially by setting the weight for the indoor environmental quality parameter with a highest priority to 1, setting the weight for the indoor environmental quality parameter with a second highest priority to ½, and setting the weight for the indoor environmental quality parameter with a third highest priority to ⅓.

2. The method according to claim 1, wherein;

the BAS includes or is a Heating Ventilation Air-Conditioning (HVAC) system.

3. The method according to claim 1, wherein:

measuring the at least two indoor environmental quality parameter values comprises the steps of:

acquiring a time series of each of the at least two indoor environmental quality parameter values over a period of time and determining an average value of each of the quality parameter values over the time series, and setting the average values as the measured indoor environmental quality parameters.

4. The method according to claim 1, wherein;

the indoor environmental quality indices range between 0 and 100.

5. The method according to claim 1, wherein;

calculating for each measured indoor environmental quality parameter value $A_P$ of indoor environmental quality parameter P the dimensionless indoor environmental quality index K from the respective measured indoor environmental quality parameter value $A_P$ comprises the steps of:

dividing the possible range of values of the respective indoor environmental parameter P into adjacent quality categories, calculating the indoor environmental quality index $K_{AP}$ to be $K_{AP}=(A_P-B_{QP})/(C_{QP}-B_{QP})*(D_{QP}-E_{QP})+E_{QP}$, wherein Cop is an upper limit of the quality category QP and $B_{QP}$ is a lower limit of the quality category $Q_P$, wherein $Q_P$ is the quality category in which the measured indoor environmental quality parameter value $A_P$ falls, wherein $E_{QP}$ is an upper limit of the index of the quality category $Q_P$ and $D_{QP}$ is a lower limit of the index of the quality category $Q_P$.

6. The method according to claim 5, wherein;

the upper limit of the index and the lower limit of the index of the quality categories are equally spaced apart and/or upper limit of the index of one quality category is the lower limit of the index of one of the adjacent quality categories.

7. The method according to claim 1, further comprising the steps of:

acquiring a time series of each of the indoor environmental quality indices over a period of time, and calculating the control index as the mean value of the average values of each of the quality indices over the time series.

8. The method according to claim 1, wherein:

for at least one indoor environmental quality parameter an upper limit of one category is the lower limit of the adjacent higher quality category and/or an upper limit of one category is the lower limit of the adjacent higher quality category.

9. The method according to claim 1, wherein;

at least one of the indoor environmental quality parameter values is a measured value of a single sensor or an average of measured values of multiple sensors of the same kind.

10. The method according to claim 1, wherein;

at least one sensor measuring one of the measured indoor environmental quality parameter values communicates wirelessly with a controller that controls the BAS.

11. The method according to claim 1, further comprising the steps of:

measuring at least one outdoor environmental quality parameter value that is of the same kind as one of the indoor environmental quality parameters, wherein the control procedure further includes the steps of controlling the BAS such that if additional ventilation is required, and if each of the outdoor environmental parameters has values within respective predetermined ranges, and if the indoor environmental quality parameters of the same kind as the outdoor environmental parameters are within the same respective predetermined ranges, then air from an outdoor environment is fed into an indoor environment.

12. The method according to claim 1, wherein:

the at least two indoor environmental parameters and at least one outdoor environmental parameter are selected from a group comprising air temperature, relative humidity, total volatile organic compounds carbon dioxide and particulate matter.

13. The method according to claim 1, wherein:

five indoor environmental quality parameters are measured and the weights are deduced from the inputs from the user regarding the priority of importance for the five indoor environmental quality parameters.

14. The method according to claim 13, wherein the setting of the weights sequentially for the five indoor environmental quality parameters further includes:

setting the weight for the indoor environmental quality parameter with a fourth highest priority to ¼, and setting the weight for the indoor environmental quality parameter with a fifth highest priority to ⅕.

15. The method according to claim 1, wherein:

an outdoor environment is a first thermal zone and an indoor environment is a second thermal zone restricted from the first thermal zone, and air from the outdoor environment is fed into the indoor environment only if:

additional ventilation is required to keep at least one indoor environmental quality parameter within its respective first predetermined range;

each of a plurality of outdoor environmental parameters has values within respective second predetermined ranges; and indoor environmental quality parameters of the same kind as the outdoor environmental parameters are within the respective second predetermined ranges.

16. The method according to claim 1, the method further comprising:

measuring the indoor environmental quality parameter values in a plurality of thermal zones, wherein each thermal zone is a locally restricted area of a building arranged such that different thermal zones are thermally isolated from each other and air is prevented from moving from one thermal zone to another without being transported by the BAS.

17. A method, comprising:

controlling a Building Automation System (BAS), including the steps of:

measuring at least two indoor environmental quality parameter values, calculating for the measured indoor environmental quality parameter values a dimensionless indoor environmental quality index from the respective measured indoor environmental quality parameter value, calculating a control index as a weighted sum of the indoor environmental quality indices, and defining a predetermined upper threshold index and starting a control procedure when the control index is below the predetermined upper threshold index, or defining a predetermined lower threshold index and starting the control procedure when the control index is above the predetermined lower threshold index, wherein the control procedure includes controlling the BAS such that at least one, multiple or all indoor environmental quality indices are each within a respective first predetermined range, five indoor environmental quality parameters are measured, and weights of the weighted sum are deduced by:

receiving inputs from a user regarding a priority of importance for each of the measured indoor environmental quality parameter values;

setting all the weights based on the inputs from the user regarding the priority of importance according to a total sum such that the total sum of all the weights is equal to 1; and the setting of the weights according to the total sum for the five indoor environmental quality parameters further includes:

setting the weight for the highest priority to be 0.44;

setting the weight for the second highest priority to be 0.22;

setting the weight for the third highest priority to be 0.14;

setting the weight for a fourth highest priority to be 0.11; and setting the weight for a fifth highest priority to be 0.09.

18. The method according to claim 17, wherein:

an outdoor environment is a first thermal zone and an indoor environment is a second thermal zone restricted from the first thermal zone, and air from the outdoor environment is fed into the indoor environment only if:

additional ventilation is required to keep at least one indoor environmental quality parameter within its respective first predetermined range;

each of a plurality of outdoor environmental parameters has values within respective second predetermined ranges; and indoor environmental quality parameters of the same kind as the outdoor environmental parameters are within the respective second predetermined ranges.

19. A method, comprising:

controlling a Building Automation System (BAS), including the steps of:

measuring at least two indoor environmental quality parameter values, calculating for the measured indoor environmental quality parameter values a dimensionless indoor environmental quality index from the respective measured indoor environmental quality parameter value, calculating a control index as a weighted sum of the indoor environmental quality indices, and defining a predetermined upper threshold index and starting a control procedure when the control index is below the predetermined upper threshold index, or defining a predetermined lower threshold index and starting the control procedure when the control index is above the predetermined lower threshold index, wherein the control procedure includes controlling the BAS such that at least one, multiple or all indoor environmental quality indices are each within a respective first predetermined range, weights of the weighted sum are deduced by:

receiving inputs from a user regarding a priority of importance for each of the measured indoor environmental quality parameter values; and setting the weights for the indoor environmental quality parameter according to the priority of importance sequentially by setting the weight for the indoor environmental quality parameter with a highest priority to 1, setting the weight for the indoor environmental quality parameter with a second highest priority to ½, and setting the weight for the indoor environmental quality parameter with a third highest priority to ⅓;

an outdoor environment is a first thermal zone and an indoor environment is a second thermal zone restricted from the first thermal zone, and air from the outdoor environment is fed into the indoor environment only if:

additional ventilation is required to keep at least one indoor environmental quality parameter within its respective first predetermined range;

each of a plurality of outdoor environmental parameters has values within respective second predetermined ranges; and indoor environmental quality parameters of the same kind as the outdoor environmental parameters are within the respective second predetermined ranges.

* * * * *